(12) United States Patent  
Otchere

(10) Patent No.: US 11,134,800 B2  
(45) Date of Patent: Oct. 5, 2021

(54) POTTED PLANT HANGER

(71) Applicant: Tonette Carter Otchere, Cincinnati, OH (US)

(72) Inventor: Tonette Carter Otchere, Cincinnati, OH (US)

(*) Notice: Subject to any disclaimer, the term of this patent is extended or adjusted under 35 U.S.C. 154(b) by 204 days.

(21) Appl. No.: 16/295,169

(22) Filed: Mar. 7, 2019

(65) Prior Publication Data

US 2019/0282003 A1 Sep. 19, 2019

Related U.S. Application Data

(60) Provisional application No. 62/643,437, filed on Mar. 15, 2018.

(51) Int. Cl.
*A47G 7/04* (2006.01)
*A01G 9/02* (2018.01)
*A01G 25/14* (2006.01)

(52) U.S. Cl.
CPC ............... *A47G 7/044* (2013.01); *A01G 9/02* (2013.01); *A01G 9/024* (2013.01); *A01G 25/14* (2013.01)

(58) Field of Classification Search
CPC .......... A47G 7/044; A47G 7/02; A47G 23/06; A47G 23/02; A47G 7/00; A47G 7/04; A01G 9/02; A01G 9/024; A01G 9/028; A01G 9/0295; A01G 9/022; A01G 9/023; A01G 9/025; A01G 9/029
See application file for complete search history.

(56) References Cited

U.S. PATENT DOCUMENTS

| | | | | |
|---|---|---|---|---|
| 2,508,947 A * | 5/1950 | Hoke | ...................... | A47L 13/58 248/300 |
| 2,679,067 A * | 5/1954 | Delmas | ................... | A47L 13/58 15/263 |
| D265,152 S * | 6/1982 | Bruno | ............................ | D6/525 |
| D295,937 S * | 5/1988 | Corbett | ......................... | D7/620 |
| 5,664,367 A * | 9/1997 | Huang | ................... | A01G 9/022 248/311.2 |
| 5,738,319 A * | 4/1998 | Grassi | .................... | A47G 7/044 248/215 |
| 7,229,056 B2 * | 6/2007 | Rosser | .................. | A47G 7/044 248/309.1 |
| 8,371,473 B2 * | 2/2013 | Scribner | .............. | A01K 5/0114 220/751 |
| 8,827,104 B2 * | 9/2014 | Hickox | .................. | A47G 23/06 220/575 |
| 9,119,490 B1 * | 9/2015 | Parodi, Jr. | ............. | B65D 25/20 |
| D763,628 S * | 8/2016 | Griffin | ........................... | D7/620 |

(Continued)

*Primary Examiner* — Kristen C Hayes
(74) *Attorney, Agent, or Firm* — Frost Brown Todd LLC

(57) ABSTRACT

A decorative pot may be filled with soil and decorative plants and hung at a non-perpendicular angle on the side of a larger pot. By hanging at an angle, the decorative plants within the decorative pot are displayed outwards to a viewer, and also serve to obscure both the decorative pot itself as well as some or all of the larger pot, such as the sidewall and rim. Displaying decorative plants and obscuring the sidewall and rim of the larger pot reduces the need to select the larger pot based upon factors such as material, quality, and design, which can all greatly influence the cost of the larger pot. The particular angle of display can be adjusted byproviding adjustable or variably sized hangers and spacers.

19 Claims, 12 Drawing Sheets

(56) References Cited

U.S. PATENT DOCUMENTS

| | | | | |
|---|---|---|---|---|
| 10,342,188 | B2* | 7/2019 | Nelson | A01G 9/02 |
| 2005/0193625 | A1* | 9/2005 | Rosser | A47G 7/044 |
| | | | | 47/68 |
| 2006/0016126 | A1* | 1/2006 | Brorson | A01G 9/028 |
| | | | | 47/86 |
| 2010/0101143 | A1* | 4/2010 | Fima | A47G 7/044 |
| | | | | 47/65.5 |
| 2011/0084087 | A1* | 4/2011 | Scribner | A01G 9/022 |
| | | | | 220/751 |
| 2013/0047506 | A1* | 2/2013 | Sheaffer | A47G 7/044 |
| | | | | 47/67 |
| 2018/0008073 | A1* | 1/2018 | Goodnow | F25D 23/028 |
| 2018/0027751 | A1* | 2/2018 | Willingham | A01G 9/029 |
| 2020/0367453 | A1* | 11/2020 | Zhai | A01G 9/023 |

* cited by examiner

US 11,134,800 B2

POTTED PLANT HANGER

PRIORITY

This application is a non-provisional of U.S. Provisional Patent Application 62/643,437, filed Mar. 15, 2018, the disclosure of which is incorporated herein by reference.

FIELD

The disclosed technology pertains to a rim mounted planter for potted plants

BACKGROUND

Ornamental gardening is a popular hobby, as seen by steady spending and growth within the more than 40 billion dollar consumer nursery and garden store industry. Colorful flowers and other visually interesting plants can be grown and arranged to create natural displays in landscaping, home exteriors, and home interiors.

Often having no real utility, as compared to horticulture directed at producing food or developing or preserving landscape, ornamental gardening is often a luxury for those that don't mind making considerable investments to visually improve a space, in some cases, for just a few months each summer and spring. As a result, ornamental gardening can be a very expensive hobby.

Frugal gardeners may then have a desire for ways to cut the cost of ornamental gardening without sacrificing visual appeal. This is especially true for outdoor ornamental gardening, where it is understood from the start that any investments made in plants, pots, tables, or other containers or display platforms will be subject to harsh weather that will destroy them over time. Due to the demand for affordable planting options, a variety of materials, designs, and finishes can be found for outdoor pots and other containers, varying from metal urns, to concrete basins, to imitation plastic containers that appear to be stone.

Even the cheapest of these options are still considerably more expensive than the plant pots and containers that plants are originally purchased in. However, many gardeners find the free containers that nurseries initially sell plants in to be, at best, unattractive, if not outright ugly, necessitating the purchase and transfer to a more expensive pot.

What is needed, therefore, is an improved container and method for creating ornamental displays that minimize the visibility of planters.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of ornamental plant containers. While the disclosed applications of the inventors' technology satisfy a long-felt but unmet need in the art of ornamental plant containers, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
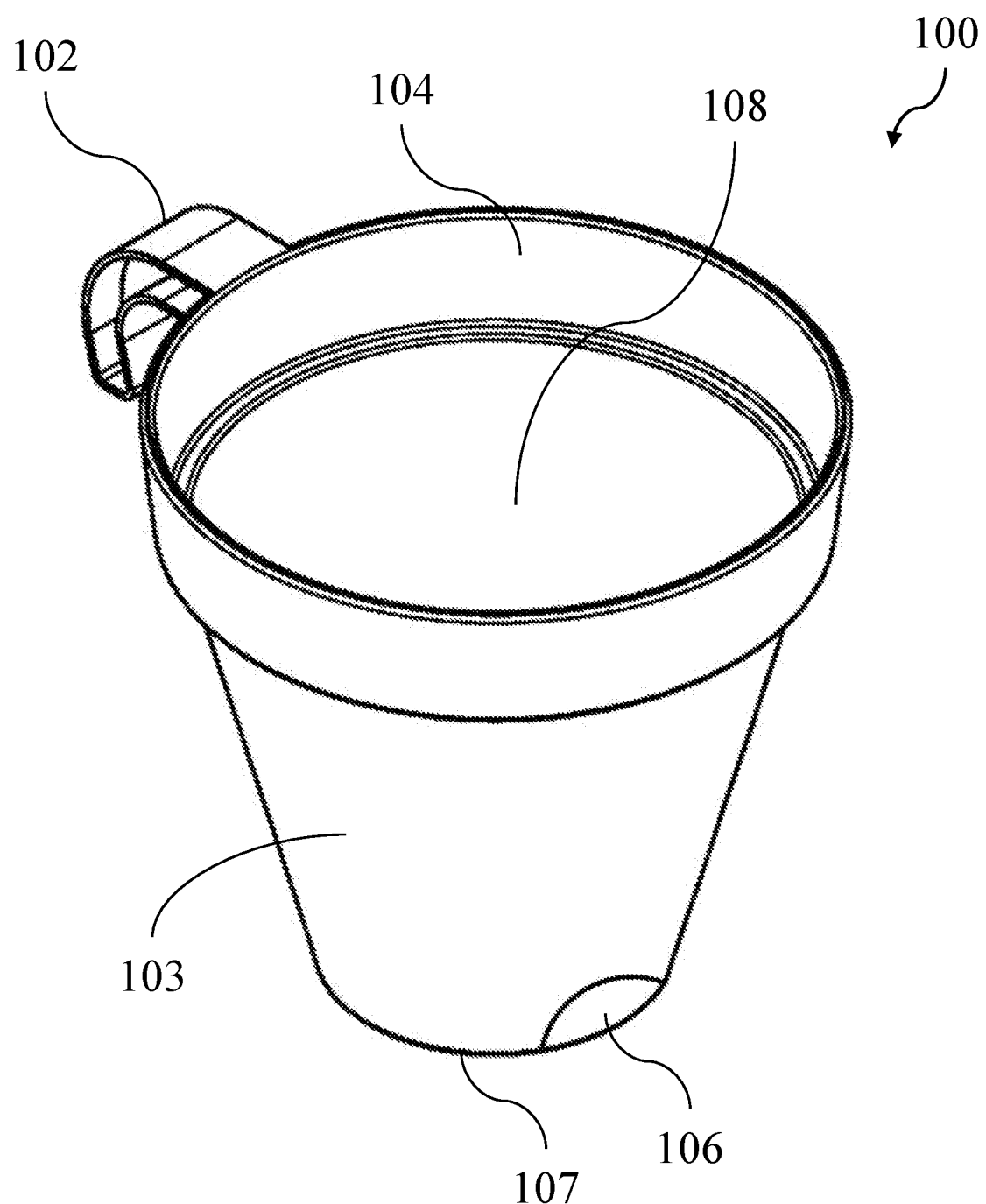
FIG. 1 is a front perspective view of an exemplary decorative pot.

Turning now to the figures, FIG. 1 shows a front perspective view of a decorative pot (100). The decorative pot (100) comprises a bottom (107) and a sidewall (103) that is enclosed to create an interior (108) that is appropriate for filling with soil and one or more plants such as flowers, vines, grasses, ferns, and others. A rim (104) encircles the sidewall (103) and a hanger (102) extends from the rim (104). The hanger (102) allows the decorative pot (100) to be mounted or hung on the rim or sidewall of another pot, where it will hang and be supported by the hanger (102) at a variable angle that is dependent upon the physical dimensions of both the decorative pot (100) and the pot that it hangs from. Since the decorative pot (100) will commonly hang at a non-perpendicular angle relative to the ground, a drain hole (106) is located at the front lower portion of the sidewall (103), the bottom (107), or both to allow appropriate drainage while hanging at a non-perpendicular angle.

Figure 2:
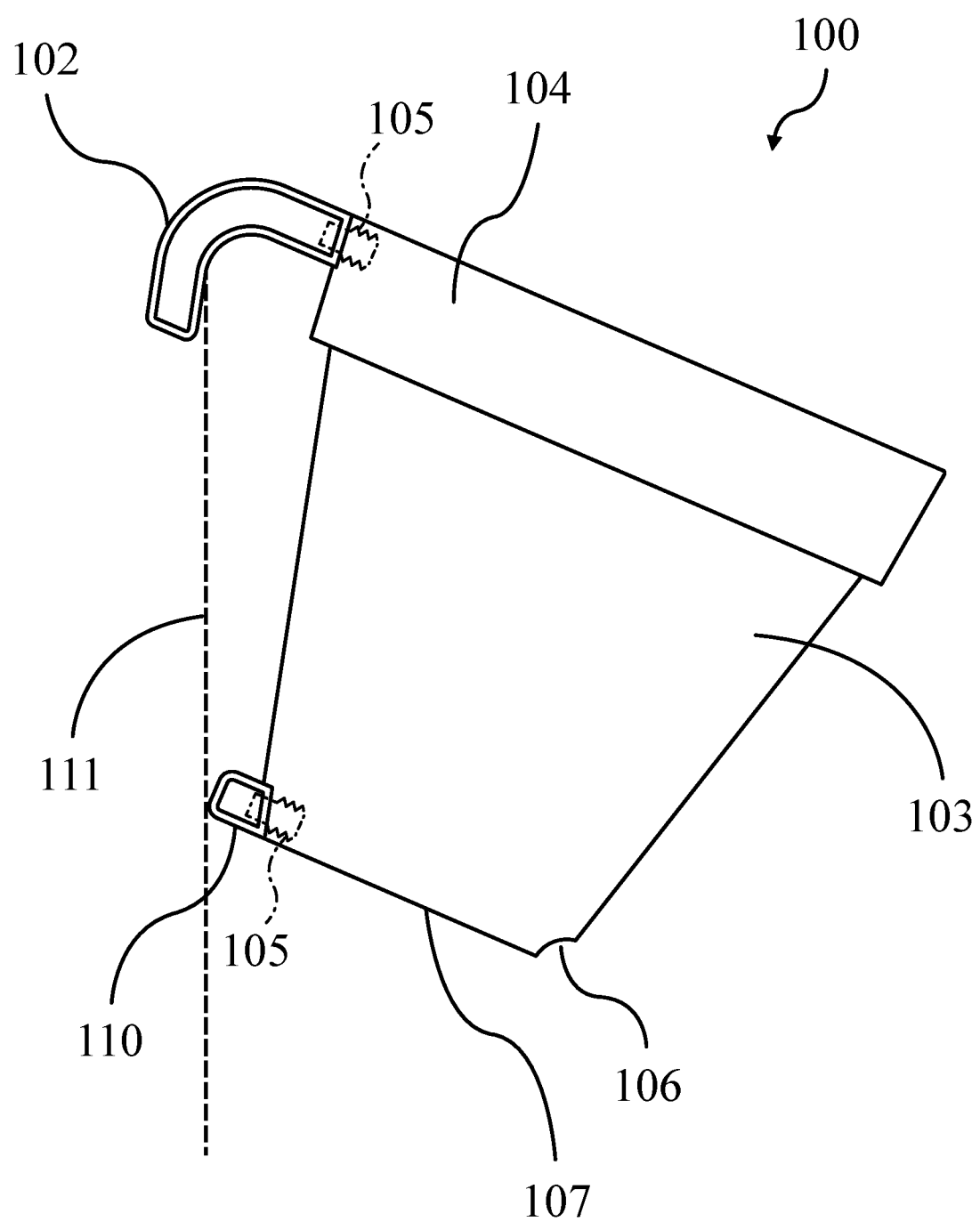
FIG. 2 is a side elevation view of the decorative pot.

FIG. 2 shows a side elevation view of the decorative pot. The position of the drain hole (106) is more visible, as well as the shape of the hanger (102). A spacer (110) extends from the rear of the sidewall (103). When mounted or hung from another rim, edge, or sidewall of a pot or other object it can be seen that the hanger (102) will support the decorative pot (100) at the top while the spacer (110) will press against the sidewall of the object from which the pot hangs. A simulated surface (111) is shown as a dashed line extending from the spacer (110) to the interior of the hanger (102). As can be seen by the angle of the simulated surface (111), if the sidewall of the object from which the decorative pot (100) hangs is perpendicular to the ground, or is an outwardly and upwardly extending cone, the angle that the decorative pot (100) hangs at results in the drain hole (106) being properly located to allow water to drain, as opposed to a drain hole centered within the interior (108), or several drain holes around the circumference of the sidewall (103). As seen in FIG. 2, the drain hole (106) may be positioned on the sidewall (103) and the bottom (107), but it should be understood that in some implementations the drain hole (106) may be positioned entirely on the sidewall (103) or entirely on the bottom (107).

Since the decorative pot (100) hangs at an angle, proper drainage can be achieved with a single drain such as the drain hole (106) located at the lowest hanging point of the decorative pot (100). Having only a single drain such as the drain hole (106) may be advantageous in that it reduces production cost as compared to having to provide multiple drain holes, and since multiple drain holes may reduce the structural strength of a pot as compared to a single drain hole.

Figure 3:
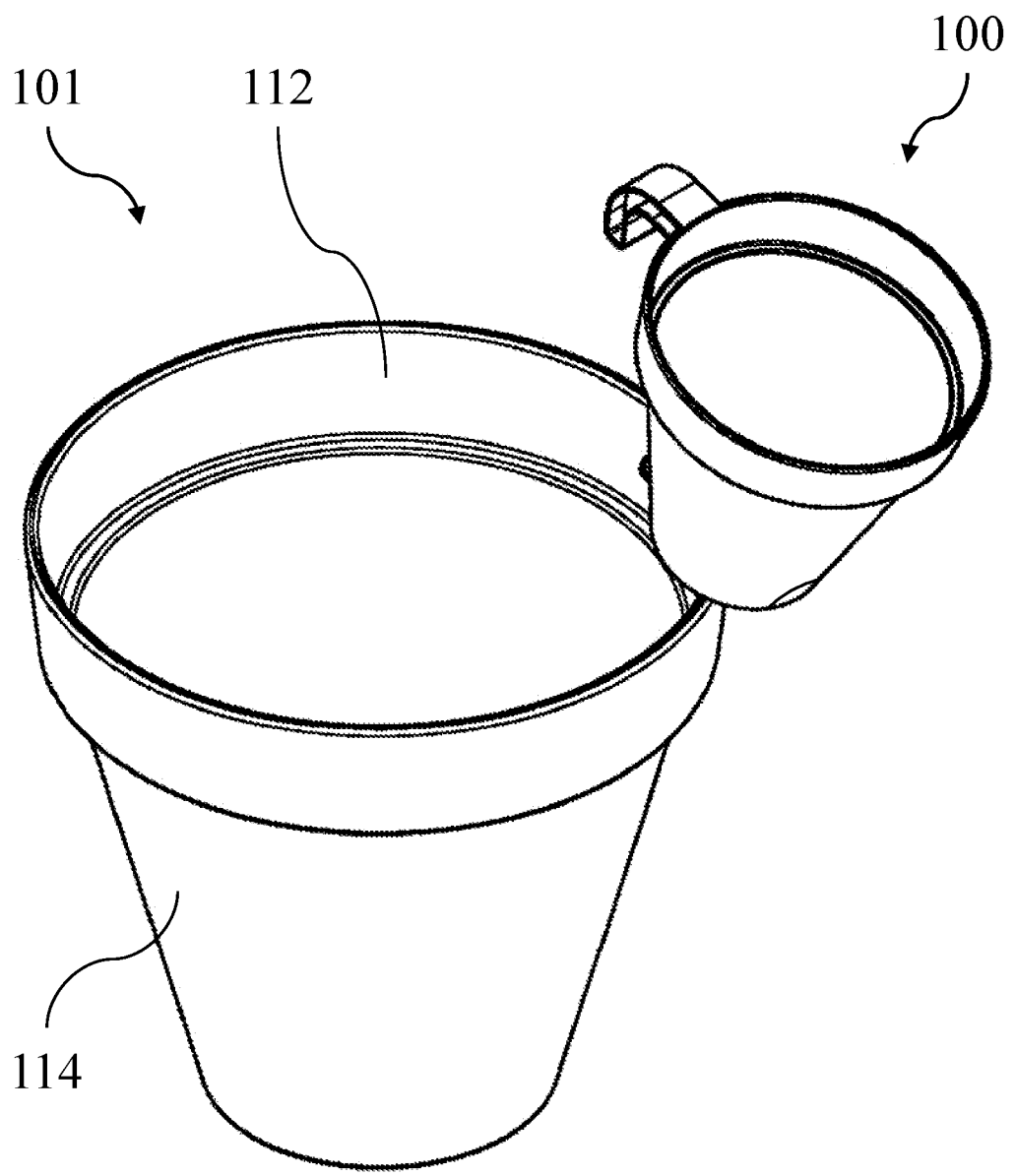
FIG. 3 is a front perspective view of the decorative pot shown in relation to an exemplary large pot.
Figure 4:
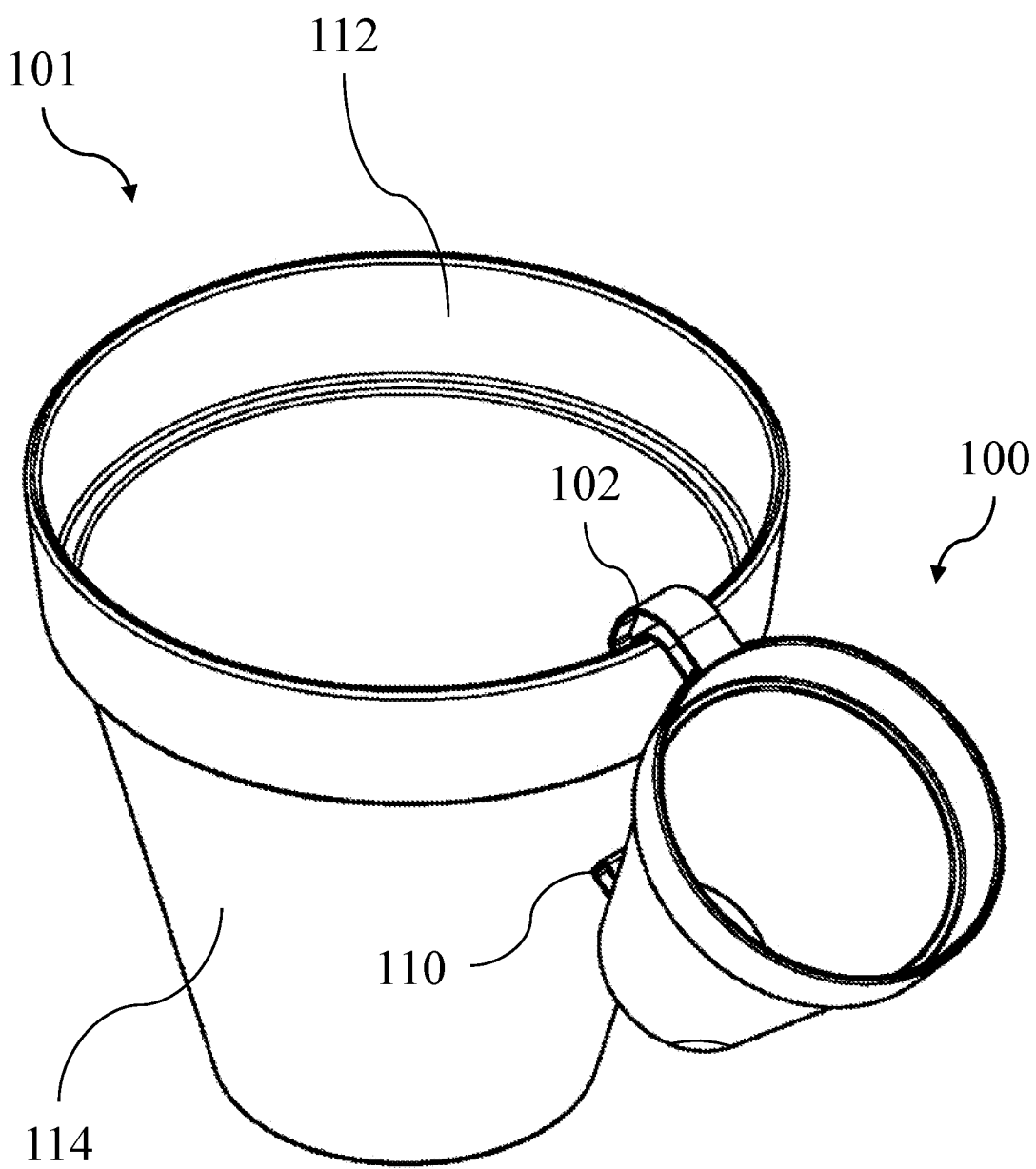
FIG. 4 is a front perspective view of the decorative pot hanging from an exemplary rim of the large pot.

Turning now to FIG. 3, that figure shows the decorative pot (100) in relation to a large pot (101) from which the decorative pot (100) may be hung. It should be noted that the large pot (101) is not the only pot or object from which the decorative pot (100) may be hung, and a variety of conventionally used pots, containers, rims, walls, or other objects from which the decorative pot (100) may be hung will be apparent to one of ordinary skill in the art in light of this disclosure. The large part (101) is comprised of a sidewall (114) that is enclosed to allow it to retain soil and plants and a rim (112). FIG. 4 shows the decorative pot (100) hanging from the rim (112) of the large pot (101) by its hanger (102). The hanger (102) can be seen hooking over the rim (112), and the spacer (110) can be seen resting against the sidewall (114). It can also be seen that due to the physical shape of the decorative pot (100) and the large pot (101), the decorative pot (100) naturally hangs at a non-perpendicular angle relative to the ground, similar to that shown in FIG. 2.

Figure 5:
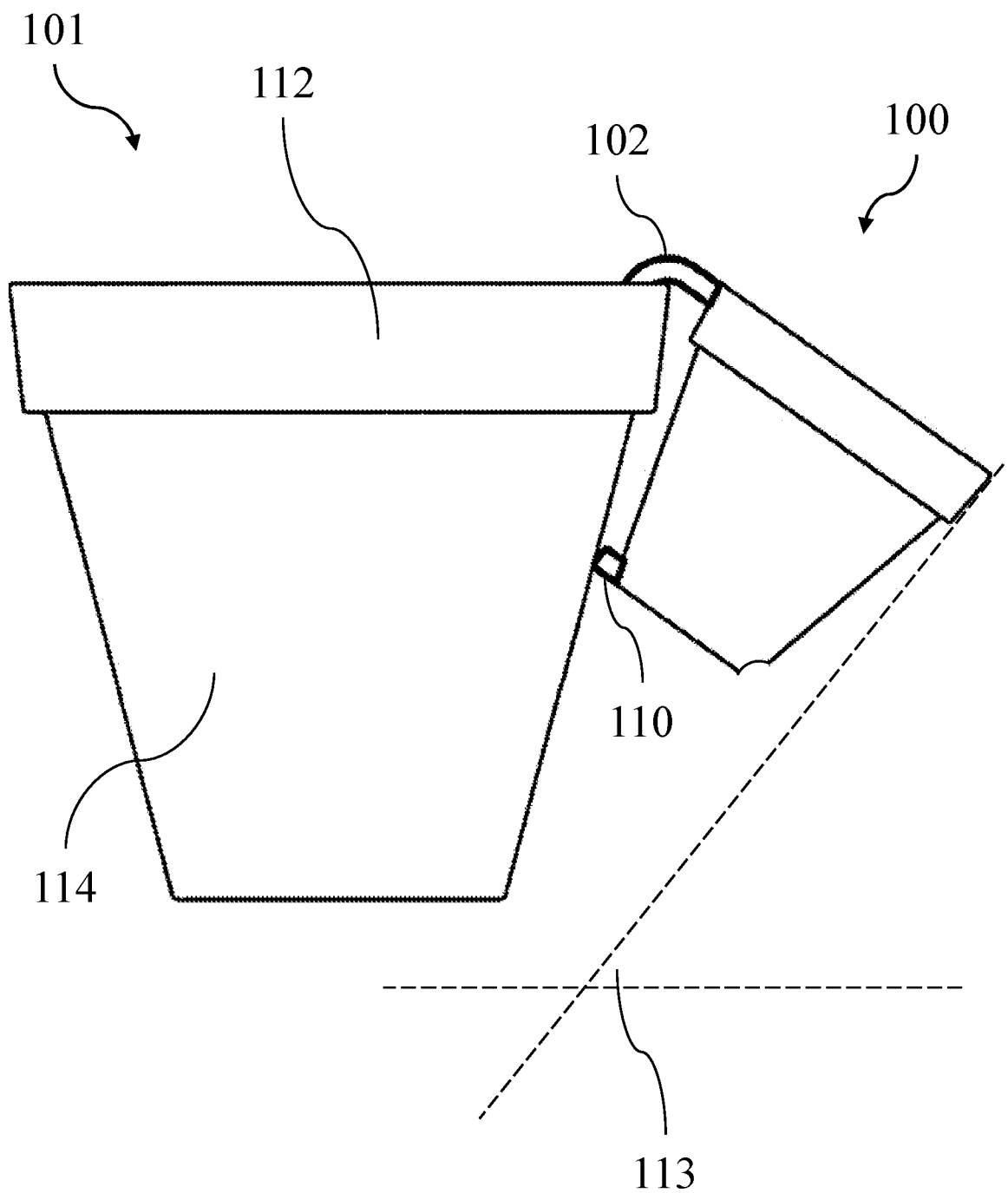
FIG. 5 is a side elevation view of the decorative pot hanging from the rim of the large pot.

FIG. 5 shows a side elevation view of the decorative pot (100) hanging from the large pot (101). The hanger (102) can be seen extending from the rim (104) of the decorative pot (100) and hooking over the rim (112) of the large pot (101). The spacer (110) can also be seen pushing the bottom of the sidewall (103) away from the sidewall (114) of the large pot (101). From this perspective it can also be seen that varying the size and length of the hanger (102) and the size and length of the spacer (110) will cause an angle (113) at which the decorative pot (100) hangs to change. As a result, by lengthening the distance that the hanger (102) outwardly extends from the rim (104) or decreasing the distance that the spacer (110) outwards extends from the sidewall (103), the angle (113) will decrease. Conversely, by decreasing the length of the hanger (102) or increasing the length of the spacer (110), the angle (113) will increase. This allows for various angles of presentation to be achieved for the decorative pot (100) by either providing hanging pots having various sizes of hanger and spacer, or by providing hanging pots having an adjustable size hanger, spacer, or both. The physical dimensions of the spacer (110) and the hanger (102) may be varied as described above to provide one or more advantages, including providing different presentation angles, controlling the flow of water relative to the drain hole (106) (e.g., preventing the decorative pot (100) from hanging at an angle that approaches or exceeds being perpendicular relative to the ground, which may allow water to be retained around the roots of a potted plant instead of draining), and preventing soil, plants, or other materials within the interior (108) from spilling out during use (e.g., preventing the decorative pot (100) from hanging at an angle that approaches being parallel relative to the ground, which may allow the contents to spill).

Figure 6:
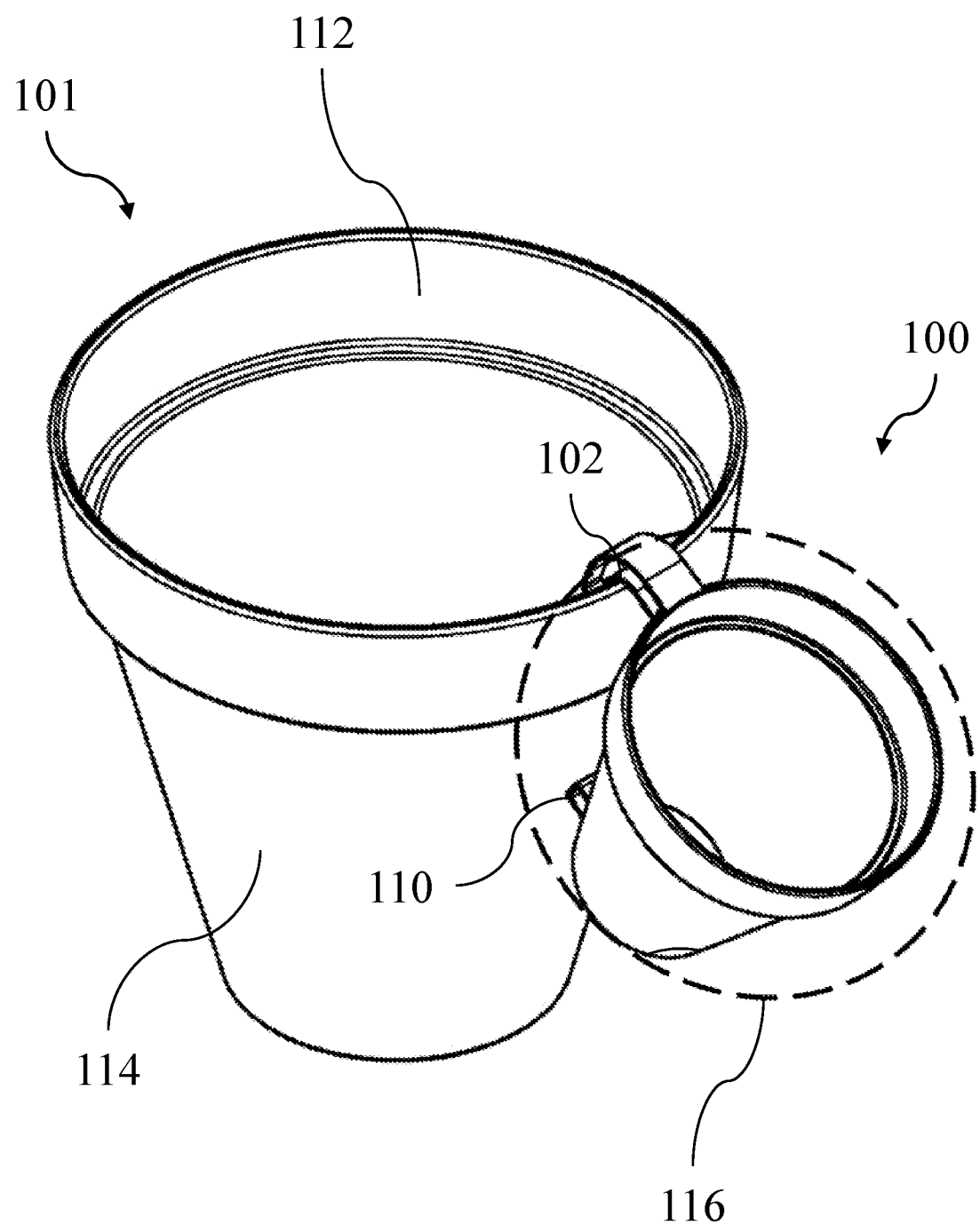
FIG. 6 is a front perspective view of the decorative pot illustrating an exemplary coverage zone of the decorative pot.
Figure 7:
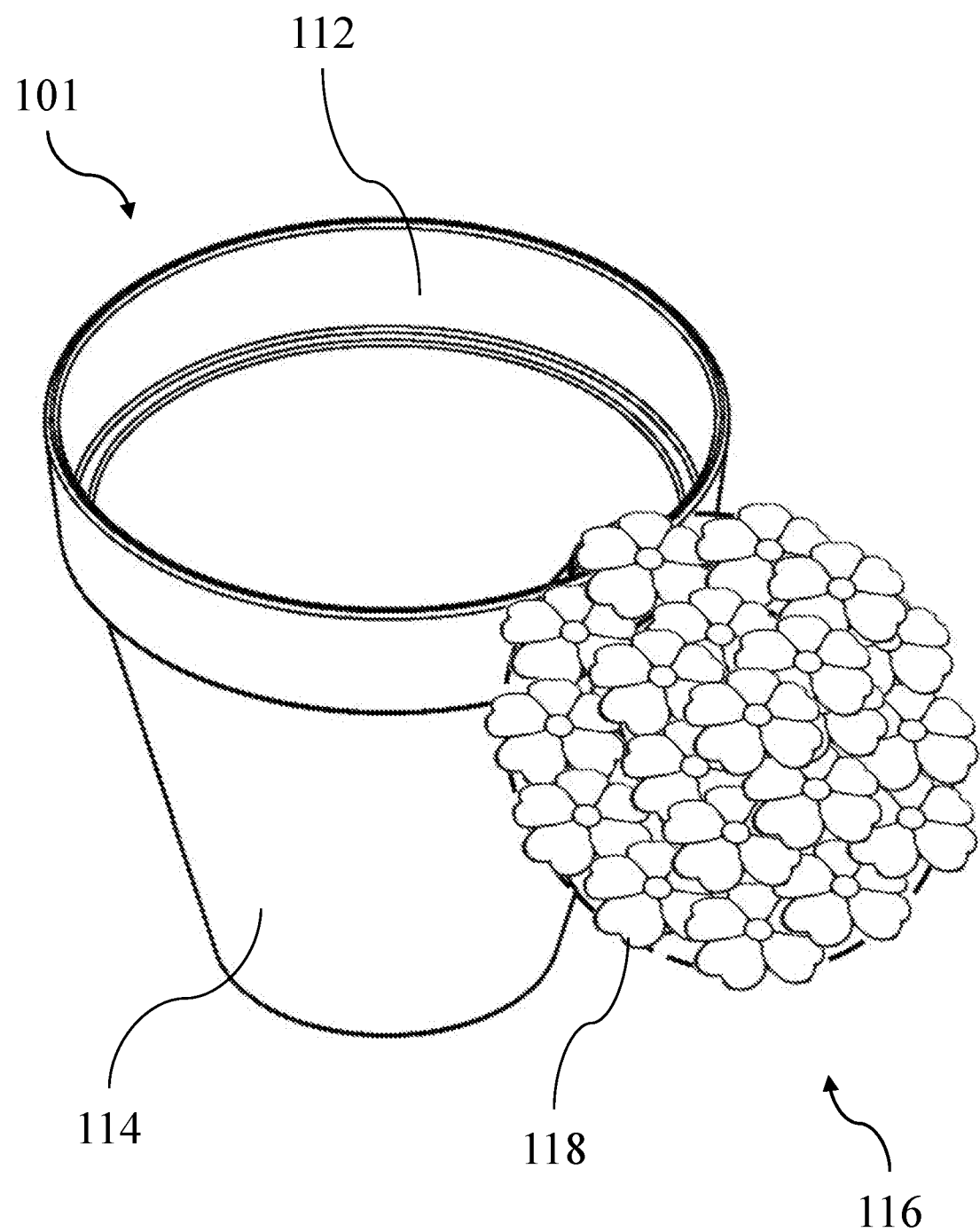
FIG. 7 is a front perspective view of the decorative pot and the coverage zone.

The angle of display of the decorative pot (100), such as the angle (113), may be important because of the nature of decorative planters, which FIG. 6 helps to illustrate. A coverage zone (116), represented by a dashed-circle, is roughly centered on and extends outwards from the decorative pot (100). The coverage zone (116) is the volume of space around the open portion of the decorative pot (100) that may be filled with rising flowers, hanging vines, or other plants. By filling the coverage zone (116) with decorative flowers or other plants, the coverage zone (116) will obscure portions of the large pot (101) when filled with one or more decorative plants (118), as can be seen in FIG. 7. In particular, the decorative plants (118) obscure portions of the sidewall (114) and the rim (112), and will additionally obscure substantially all of the decorative pot (100).

Figure 8:
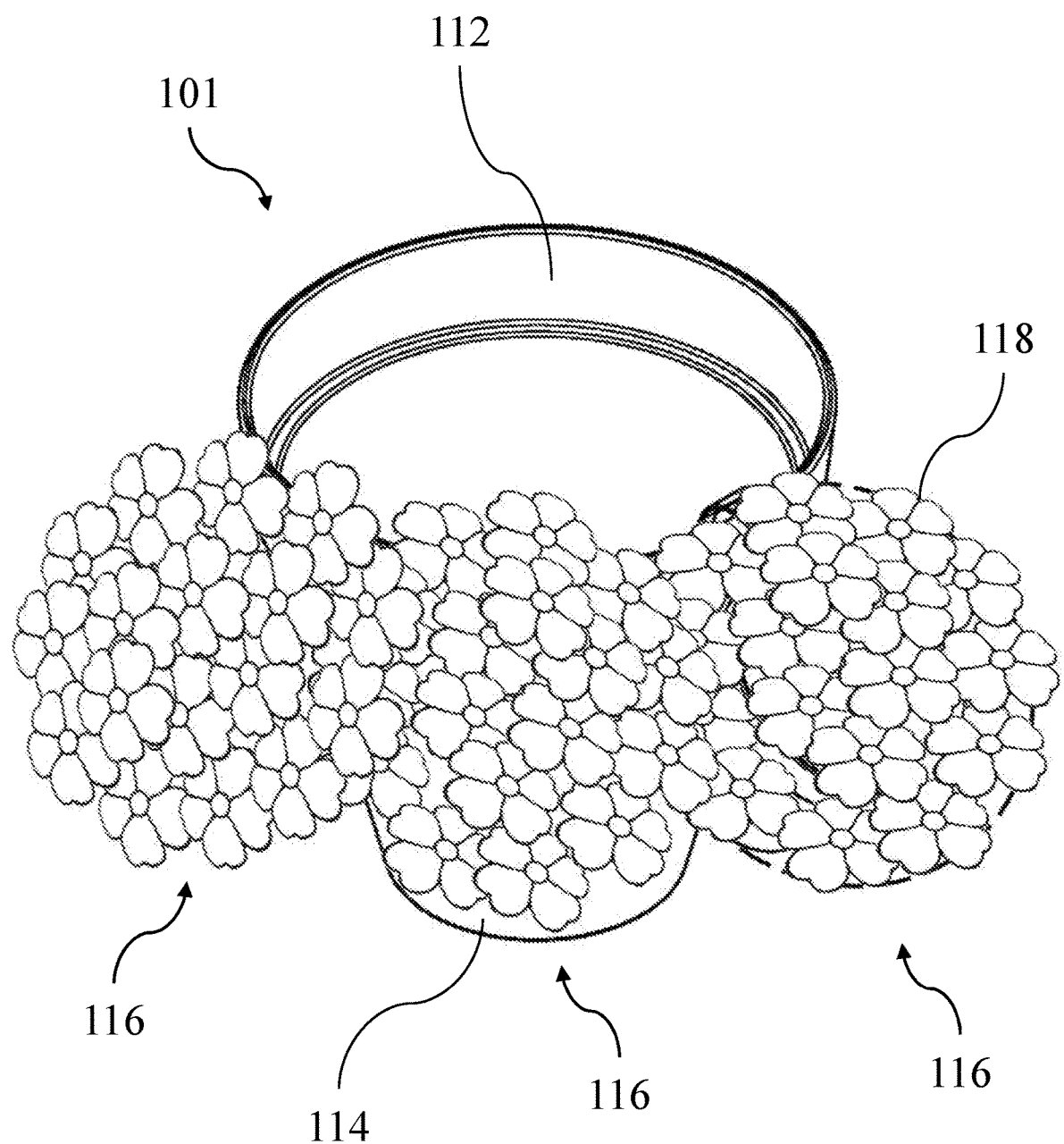
FIG. 8 is a front perspective view of the decorative pot illustrating several exemplary coverage zones.

As a result, viewers of an ornamental plant display including the decorative pot (100) used in this manner may be presented with the ornamental plants of the coverage zone (116) instead of the obscured portions of the large pot (101). Since the large pot (101) is partially obscured (or, in the case of using several of the decorative pot (100), substantially or wholly obscured), the visual appeal of materials or designs of the large pot (101) may be unimportant, and the cost of a more visually appealing container could be avoided. FIG. 8 illustrates the visual effect that may be achieved by using one or more of the decorative pots disclosed herein, such as the decorative pot (100), to create one or more of the coverage zones (116) about the sidewall of a pot such as the large pot (101). By varying the angle of presentation, the number of coverage zones, and the decorative plants (118) contained therein (e.g., selecting stalked flowers or ferns that grow upwards and outwards, selecting vines or creepers that extend downwards, or both), the exterior portions of another pot may be substantially or wholly obscured.

Figure 9:
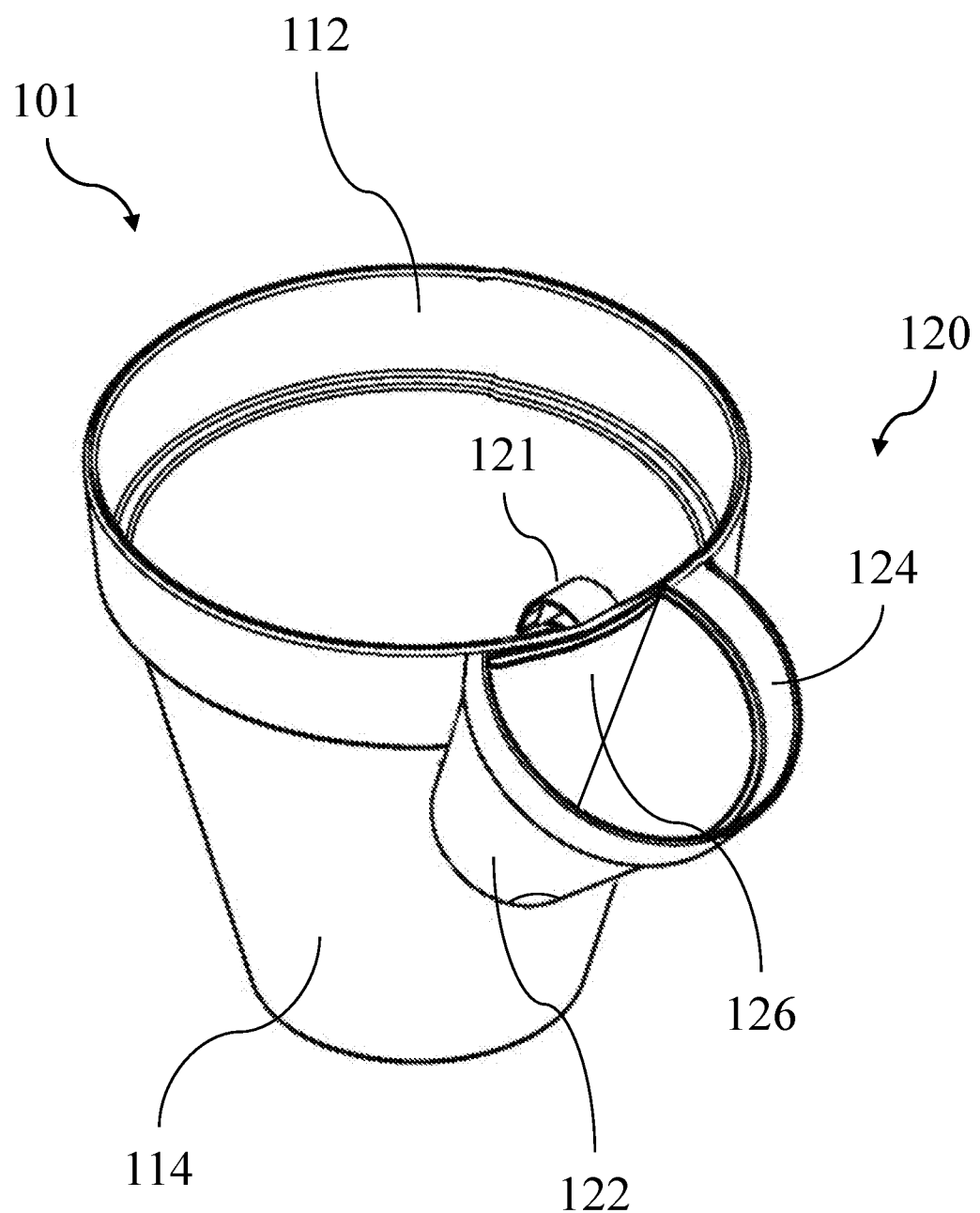
FIG. 9 is a front perspective view of an exemplary fitted decorative pot.

While the decorative pot (100) disclosed above is effective and flexible in the variety of pots, sidewalls, rims, or other objects it may hang from, it will be apparent to one of ordinary skill in the art, in light of this disclosure, that hanging pots of other sizes and having other characteristics may also be useful. For example, FIG. 9 shows a fitted pot (120) that more closely fits the sidewall (114) of the large pot (101). The fitted pot (120) comprises a hanger (121) extending from a rim (124) and a sidewall (122), having similar features and capabilities as similar characteristics of the decorative pot (100).

Figure 10:
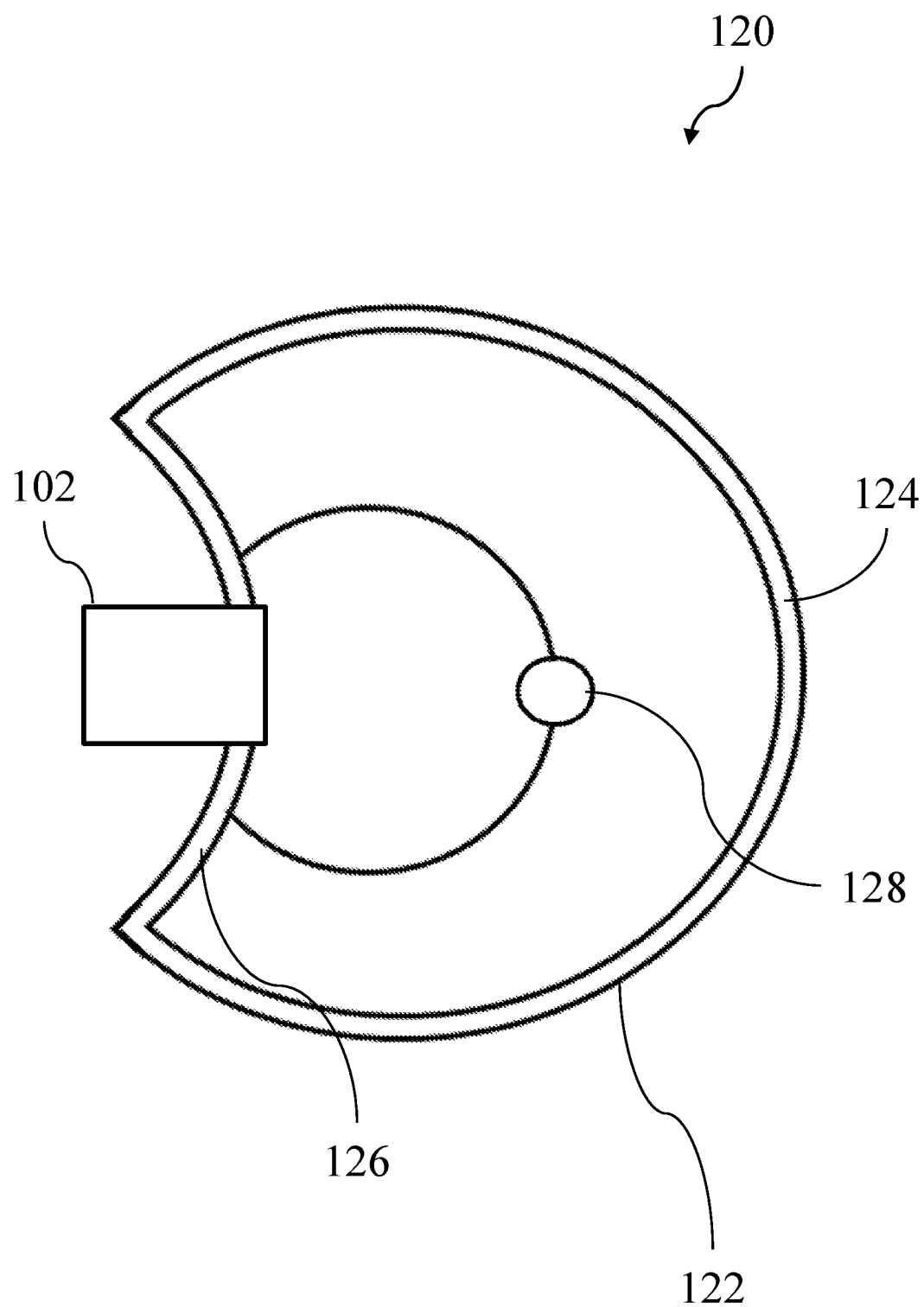
FIG. 10 is a top down view of the fitted decorative pot.

One difference is that a portion of the sidewall (122) is fitted or molded to partially or wholly mirror the sidewall (114), forming a concave sidewall (126). Since the concave sidewall (126) is able to conform to the shape of the sidewall (114), the angle at which the fitted pot (120) hangs relative to the ground can be effectively varied without the need for adjusting the length of the hanger (121), and a spacer is unnecessary. FIG. 10 shows a top down view of the fitted pot (120), where the concave sidewall (126) can be more clearly seen, which allows the fitted pot (120) to fit snugly against pots like the large pot (101). A drain hole (128) can also be seen in the bottom of the fitted pot (120), which may be useful for hanging pots as has been previously described. While the concave sidewall (126) is shaped to fit against a circular or curved pot having a sidewall such as the sidewall (114), it should be understood that hanging decorative pots can have variously shaped rear sidewall portions, such as the concave sidewall (126), to allow them to conform to and rest against, for example, square or rectangular pots (e.g., resting flat against a sidewall, or fitting and resting on a 90 degree corner), other polygonal pots, and irregularly shaped pots.

Figure 11:
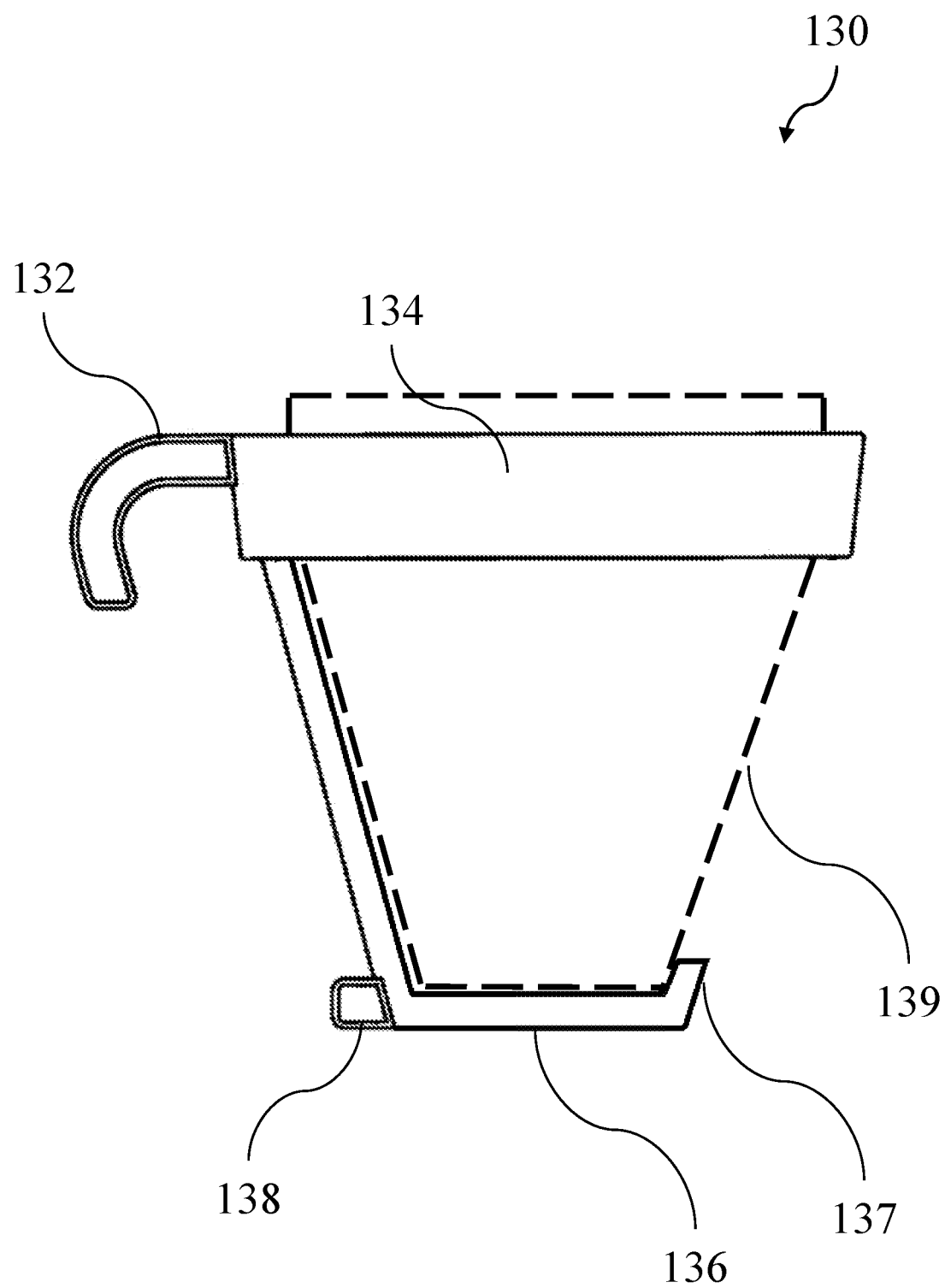
FIG. 11 is a side elevation view of an exemplary hanging frame.

FIG. 11 shows an alternative implementation of the above disclosed hanging pots. A hanging frame (130) comprises a hanger (132) shaped to fit a rim such as the rim (112), and a spacer (138). The hanger (132) extends from a rim (134), and a frame (136) extends downwards from the rim (134), then forwards to a frame lip (137). A dashed outline of a decorative pot (139) is illustrated within the hanging frame (130), resting on the frame (136) and being held in place and encircled by the rim (134) at the top, and the frame lip (137) at the bottom. The hanging frame (130) may be sized and shaped to fit a variety of commercially available and affordable pots that within the space occupied by the decorative pot (139). One advantage of the hanging frame (130) is that, due to a more minimalist design, it may be made of more rugged materials such as durable plastics or metals, while being capable of holding a variety of pots of varying quality or materials. In this manner, if a contained pot is damaged it may be more easily replaced. Further, the hanging frame (130) may be placed on a pot such as the large pot (101) and left there for a period of time, while two or more other pots are swapped in and out. This could allow decorative displays to be quickly modified without having to move the hanging frame (130), or own more than one of the hanging frame (130).

As has been mentioned, pots having an adjustable hanger or spacer may be useful in allowing a decorator to vary the angle at which the pot rests and adjust the perspective of the resulting coverage zone. Providing adjustable hangers and spacers could be achieved in a variety of ways that will be apparent to one of ordinary skill in the art, in light of this disclosure. For example, a pot such as the decorative pot (100) may be purchased with several hangers, such as hanger (102), of varying sizes that may be attached to or removed from the rim (104). As another example, a screw mechanism (105) (FIG. 2) may attach the hanger (102) to the rim (104) or the spacer (110) to the sidewall (103) which can vary the distance that each extends from the decorative pot (100) with the turn of the screw. As another example, the spacer (110) may have one or more rods of varying lengths that may be hinged at one end such that they can pivot and fold out of the spacer (110).

Figure 12:
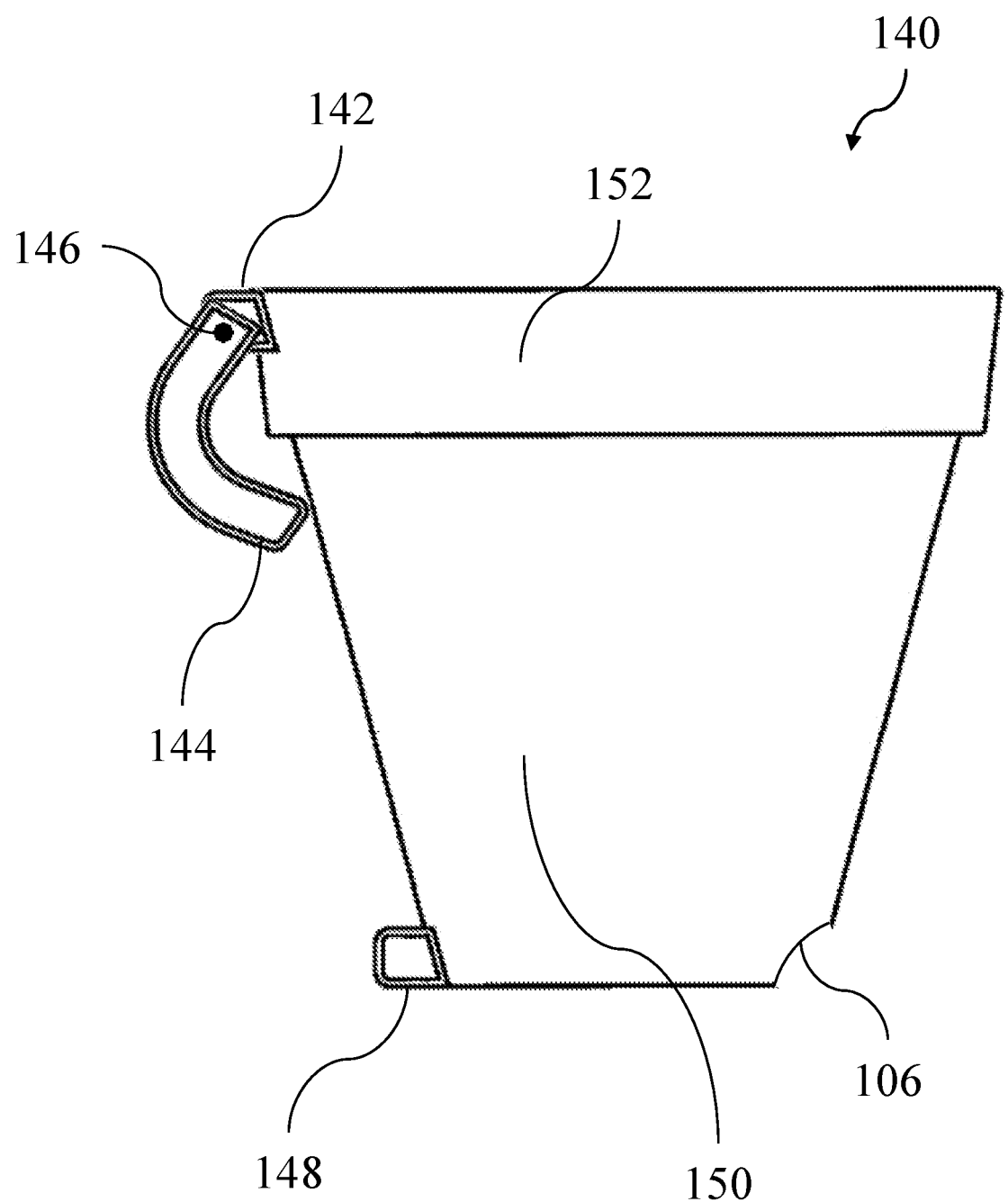
FIG. 12 is a side elevation view of an exemplary decorative pot with an exemplary adjustable hanger.

FIG. 12 shows another example. A decorative pot (140) comprises a sidewall (150), a spacer (148), and a rim (152) having similar features and capabilities as those disclosed in the context of the decorative pot (100). A hinge mount (142) extends from the rim (152), and a spring hinge (146) attaches a hanger (144) to the hinge mount (152). The spring hinge (146) allows the hanger (144) to pivot and rotate about the hinge mount (142), and may be spring biased downwards towards the position shown in FIG. 12. In this manner, the decorative pot (140) may be clamped to the rim (112) of a pot such as the large pot (101). This may provide a more secure attachment than the hanger (102), and may also allow the spring hinge (146) to pull the decorative pot (140) more tightly against the sidewall (114) of the large pot (101), which can affect the angle and presentation of the coverage zone (116).

A variety of materials and methods may be used to produce the various decorative pots and components disclosed herein, including many metals, plastics, resins, glasses, and other natural and synthetic materials. For example, the hanging frame (130) may be made of weatherproof and durable materials such as stainless steel or aluminum, while the decorative pot (100) may be made of rugged plastics when intended for a lifetime of use, or more lightweight plastics when intended for several seasons of use. Such factors may be selected for a particular implementation based upon factors of cost, performance, or both. It is also contemplated that the various disclosed decorative pots may be manufactured in a variety of ways, including being formed or molded as a single unibody piece, or being assembled from several components.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. An assembly comprising:
   (a) a decorative pot comprising:
      (i) a body comprising a bottom, a sidewall, and a rim defining an interior, the interior adapted to hold soil and plants;
      (ii) a hanger extending from the rim on a proximate side of the body, the hanger adapted to hang the decorative pot from an edge of a second pot at a non-perpendicular angle relative to the ground;
      (iii) a drain hole positioned on a lower distal side of the body, wherein the drain hole is positioned such that water drains from the body when the decorative pot hangs at the non-perpendicular angle; and
   (b) the second pot, wherein the hanger hangs the decorative pot from the edge of the second pot at the non-perpendicular angle relative to the ground such that the body is positioned external to the second pot and such that the bottom is oriented at an oblique angle relative to the ground.

2. The decorative pot of claim 1, wherein the drain hole is positioned on the lower distal side of the body such that the drain hole is the lowest point when the decorative pot hangs at the non-perpendicular angle.

3. The decorative pot of claim 1, further comprising a spacer extending from the sidewall on the proximate side of the body, the spacer adapted to separate the body from the second pot when the decorative pot hangs from the second pot.

4. The decorative pot of claim 3, wherein the hanger and the spacer each comprise physical dimensions adapted to cause the decorative pot to hang from the second pot at the non-perpendicular angle.

5. The decorative pot of claim 3, wherein the spacer is adapted to provide an adjustable physical dimension configured to be adjusted to change the non-perpendicular angle at which the decorative pot hangs from the second pot.

6. The decorative pot of claim 5, wherein the spacer comprises a screw mechanism selectively operable to increase or decrease the non-perpendicular angle at which the decorative pot hangs from the second pot.

7. The decorative pot of claim 1, wherein the hanger is adapted to provide an adjustable physical dimension configured to be adjusted to change the non-perpendicular angle at which the decorative pot hangs from the second pot.

8. The decorative pot of claim 1, wherein the sidewall of the proximate side of the body comprises a concave surface adapted to fit against a convex sidewall surface of the second pot.

9. The decorative pot of claim 1, wherein the body does not include any drain hole other than the drain hole, and wherein the drain hole is positioned on the lower distal side of the body substantially opposite of the hanger.

10. A decorative pot comprising:
(a) a body comprising a bottom, a sidewall, and a rim defining an interior, the interior adapted to hold soil and plants;
(b) a hanger extending from the rim on a proximate side of the body, the hanger adapted to hang the decorative pot from an edge of a second pot at a non-perpendicular angle relative to the ground;
(c) a drain hole positioned on a lower distal side of the body, wherein the drain hole is positioned such that water drains from the body when the decorative pot hangs at the non-perpendicular angle, wherein the hanger is adapted to provide an adjustable physical dimension configured to be adjusted to change the non-perpendicular angle at which the decorative pot hangs from the second pot, wherein the hanger comprises a screw mechanism selectively operable to increase or decrease the non-perpendicular angle at which the decorative pot hangs from the second pot.

11. A decorative pot comprising:
(a) a body comprising a bottom, a sidewall, and a rim defining an interior, the interior adapted to hold soil and plants;
(b) a hanger extending from the rim on a proximate side of the body, the hanger adapted to hang the decorative pot from an edge of a second pot at a non-perpendicular angle relative to the ground;
(c) a drain hole positioned on a lower distal side of the body, wherein the drain hole is positioned such that water drains from the body when the decorative pot hangs at the non-perpendicular angle, wherein the hanger comprises a spring hinge connection that couples the hanger with the rim, and wherein the spring hinge connection is adapted to cause the decorative pot to hang at the non-perpendicular angle.

12. A decorative pot comprising:
(a) a body comprising a bottom, a sidewall, and a rim defining an interior, the interior adapted to hold soil and plants;
(b) a hanger extending from the rim on a proximate side of the body, the hanger adapted to hang the decorative pot from an edge of a second pot at a non-perpendicular angle relative to the ground;
(c) a drain hole positioned on a lower distal side of the body, wherein the drain hole is positioned such that water drains from the body when the decorative pot hangs at the non-perpendicular angle, wherein the sidewall of the proximate side of the body comprises an angular surface adapted to fit against an angular corner surface of the second pot.

13. A method comprising:
(a) selecting a decorative pot to hang from a second pot, the decorative pot comprising:
(i) a body comprising a bottom, a sidewall, and a rim defining an interior, the interior adapted to hold soil and plants,
(ii) a hanger extending from the rim on a proximate side of the body, the hanger adapted to hang the decorative pot from an edge of a second pot at a non-perpendicular angle relative to the ground,
(iii) a drain hole positioned on a lower distal side of the body, wherein the drain hole is positioned such that water drains from the body when the decorative pot hangs at the non-perpendicular angle;
(b) hanging the decorative pot from the edge of the second pot such that the body is positioned external to the second pot and such that the bottom is oriented at an oblique angle relative to the ground; and
(c) arranging soil and plants within the decorative pot, wherein the arrangement of plants within the decorative pot obscures a portion of the second pot rim and sidewall when the decorative pot is hung from the second pot at the non-perpendicular angle.

14. The method of claim 13, further comprising:
(a) determining a desired presentation angle of the decorative pot; and
(b) selecting the decorative pot based on the physical dimensions of the hanger and the second pot to provide the desired presentation angle as the non-perpendicular angle.

15. The method of claim 13, further comprising arranging decorative plants within the interior such that:
(a) a plurality of decorative portions of the decorative plants extends from the decorative pot; and
(b) when the decorative pot hangs at the non-perpendicular angle, the plurality of decorative portions substantially cover the viewable portions of the rim and the sidewall of the decorative pot, and cover at least part of the viewable portions of the second pot.

16. The method of claim 15, further comprising arranging a plurality of decorative pots containing decorative plants around the second pot, such that the viewable portions of the second pot are substantially covered by the plurality of decorative pots and decorative plants.

17. The method of claim 13, further comprising
(a) determining a sidewall shape of the second pot; and
(b) selecting the decorative pot based on the sidewall of the proximate side of the body comprising a surface adapted to fit against the sidewall shape of the second pot and cause the decorative pot to hang at the non-perpendicular angle;
physical dimensions of the hanger and the second pot to provide the desired presentation angle as the non-perpendicular angle.

18. A method comprising:
(a) selecting a decorative pot to hang from a second pot, the decorative pot comprising:
(i) a body comprising a bottom, a sidewall, and a rim defining an interior, the interior adapted to hold soil and plants,
(ii) a hanger extending from the rim on a proximate side of the body, the hanger adapted to hang the decorative pot from an edge of a second pot at a non-perpendicular angle relative to the ground,
(iii) a drain hole positioned on a lower distal side of the body, wherein the drain hole is positioned such that water drains from the body when the decorative pot hangs at the non-perpendicular angle, and
(iv) a spacer extending from the sidewall on the proximate side of the body, the spacer adapted to separate the body from the second pot when the decorative pot hangs from the second pot;
(b) hanging the decorative pot from the second pot;

(c) arranging soil and plants within the decorative pot, wherein the arrangement of plants within the decorative pot obscures a portion of the second pot rim and sidewall when the decorative pot is hung from the second pot at the non-perpendicular angle;

(d) determining a desired presentation angle of the decorative pot; and (e) selecting the decorative pot based on the physical dimensions of the hanger and the second pot to provide the desired presentation angle as the non-perpendicular angle;

(f) determining a desired presentation angle of the decorative pot; and (g) selecting the decorative pot based on the physical dimensions of the spacer and the second pot to provide the desired presentation angle as the non-perpendicular angle.

19. A decorative pot holder comprising:

(a) a body comprising a frame, a frame lip, and a rim, wherein each of the frame, the frame lip, and the rim are adapted to receive and hold in place a pot inserted into the rim;

(b) a hanger extending from the rim on a proximate side of the body, the hanger adapted to hang the decorative pot holder from an edge of a second pot; and (c) a spacer extending from the sidewall on the proximate side of the body, the spacer adapted to separate the body from the second pot when the decorative pot hangs from the second pot;

wherein:

(i) the hanger and the spacer each comprise physical dimensions selected to cause the decorative pot holder to hang from the second pot at a non-perpendicular angle, (ii) the non-perpendicular angle is selected to present decorative flowers contained within the pot that is held by the body at an angle that:

(A) substantially covers viewable portions of the rim and a sidewall of the pot, (B) covers some viewable portion of the second pot.

* * * * *